United States Patent Office 3,417,116
Patented Dec. 17, 1968

3,417,116
OMEGA-CYANO-POLYMETHYLENETIN LEWIS ACID COMPLEXES AND THE PREPARATION THEREOF
William J. Considine, Somerset, and Gerald H. Reifenberg, Plainfield, N.J., assignors to M & T Chemicals Inc., New York, N.Y., a corporation of Delaware
No Drawing. Filed Jan. 3, 1966, Ser. No. 517,938
19 Claims. (Cl. 260—429.7)

This invention relates to organotin complexes and, more particularly, to complexes of tetravalent cyanoalkyltin and Lewis acids, and to methods for preparing the same. This invention is also concerned with methods for redistributing the present novel complexes and the resultant redistribution compositions.

It is an object of this invention to provide novel complexes of Lewis acids and tetravalent organotin characterized by the presence of at least one nitrile group in said organotin. Another object of this invention is to provide new methods for preparing the present novel complexes and for redistributing the complexes to form novel redistribution compositions. Other objects of this invention will be apparent to those skilled in the art on inspection of the following description.

Broadly stated, the present invention contemplates organotin complexes of the following general formula:

$$\{R_1\!-\!\underset{\underset{R_4}{|}}{\overset{\overset{R_2}{|}}{Sn}}\!-\!R_3\} \cdot yL$$

in which $R_1$ is $NC(CH_2)_m\!-\!$, $m$ is an integer at least about 2, $R_2$, $R_3$ and $R_4$ each is an alkyl radical, an aryl radical or $NC(CH_2)_m\!-\!$, $y$ is 1 or 2, and L is a Lewis acid. Preferably, the methylene chain in the nitrile group is less than five carbon atoms.

Suitable alkyl for $R_2$, $R_3$ and $R_4$ may typically be straight chain alkyl or branched alkyl including methyl, ethyl, n-propyl, isopropyl, n-butyl, isobutyl, sec-butyl, tert-butyl, n-amyl, neopentyl, isoamyl, n-hexyl, isohexyl, heptyls, octyls, decyls, dodecyls, tetradecyl, octadecyl, etc. Preferred alkyl includes lower alkyl, i.e., having less than about 8 carbon atoms. Suitable aryl may include phenyl, naphthyl, etc. Both alkyl and aryl for $R_2$, $R_3$ and $R_4$ may be inertly substituted, e.g., may bear a non-reactive substituent such as alkyl, aryl, cycloalkyl, aralkyl, alkaryl, alkenyl, ether, halogen, nitro, ester, etc. Typical substituted alkyls include 3-chloropropyl, 2-ethoxyethyl, carboethoxymethyl, etc. Inertly substituted aryl includes chlorophenyl, anisyl, biphenyl, etc.

Advantageously, the organotin complexes of this invention may be prepared by the method which comprises reacting a first compound of the formula:

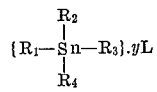

in which $R_1$, $R_2$, $R_3$ and $R_4$ have the same significance as above depicted with a Lewis acid in an inert non-donor solvent. The resultant complex is then recovered from the reaction solution.

A number of Lewis acids may be used to form the complexes of this invention. Among these acids we found boron trifluoride, aluminum chloride, titanium tetrachloride, tin tetrachloride, and tin tetrabromide to be eminently suitable. These acids may form either a 1:1 complex or a 1:2 complex, i.e., $y$ equals 1 or 2. Generally, only the 1:1 complex is formed when the Lewis acid is tin tetrachloride or tin tetrabromide regardless of the ratio of reactants in the solvent.

In one preferred embodiment of this invention, the organotin complexes have the formula:

$$[NC(CH_2)_m]_4Sn \cdot X_4$$

in which $m$ is an integer 2–4, and X is chlorine or bromine. These complexes are conveniently prepared by reacting nitriles of the general formula:

$$[NC(CH_2)_m]_4Sn$$

with Lewis acids of the forumla:

$$SnX_4$$

in an inert non-donor solvent at a temperature in the range between $-10°$ C. to $60°$ C. Preferably the reaction is carried out in an inert atmosphere. For this reaction, the inert non-donor solvent advantageously may be methylene chloride or chloroform. The molar ratio of the nitrile and the Lewis acid may be in the range from about $\frac{1}{2}$ to about 2.

The organotin complexes of this invention, particularly, the complexes of the general formula:

$$[NC(CH_2)_m]_4Sn \cdot SnX_4$$

are valuable intermediates for the preparation of organotin redistribution products $(R)_3SnX$, $(R)_2SnX_2$, and $RSnX_3$ in which R is an alkyl, and aryl or an $[NC(CH_2)_m]$-group, and each of the three redistribution products contains at least one $[NC(CH_2)_m]$-group. According to this invention, the redistribution reaction is carried out by heating the organotin complex of the formula:

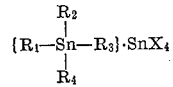

at a temperature and for a period sufficient to redistribute the complex to form the above-mentioned organotin redistribution products.

Depending on the complexes, the temperature and the time required for the redistribution may vary within wide ranges. Generally, we found the temperature may be below $150°$ C. and the time required is seldom more than 6 hours. In certain redistribution reactions involving the complexes $$[NCCH_2CH_2]_4Sn \cdot SnX_4$$

a temperature above $150°$ C. is definitely detrimental due to decomposition and darkening of the resultant products. There does not appear to be any sharp lower temperature limit. Reaction carried out at a temperature much below $100°$ C., however, will require an unadjustifiable length of time for complete reaction. The optional temperature appears to be in the range from $100°$ C. to $150°$ C., preferably in the range $110$–$120°$ C. At this temperature range, the reaction may be completed within 2 to 6 hours.

For the redistribtuion reaction, the organotin complexes of this invention may be the sole starting material. Additional organotin nitrile or tin tetrahalide, however, may also be added to form a reaction mixture that favors the formation of one or more of the redistribtuion products. For example, when $[NC(CH_2)_m]_4Sn \cdot X_4$ is used as the starting material for the redistribution reaction, the following modes of reactions may be contemplated:

(I)              $[NC(CH_2)_m]_4Sn \cdot SnX_4$ (II) $[NC(CH_2)_m]_4Sn \cdot SnX_4 + [NC(CH_2)_m]_4Sn \xrightarrow{\Delta}$ (III)        $[NC(CH_2)_m]_4Sn \cdot SnX_4 + SnX_4$

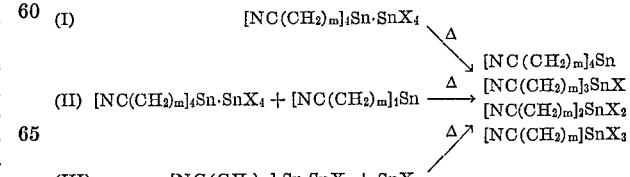

The final compositions of the redistribution reactions according to the reactions (I), (II), and (III) contain all three possible ($\omega$ - cyanopolymethylene)tin halides, although the content of each halide in the composition varies according to the reactions.

The organotin complexes used for the redistribtuion reaction may be prepared prior to the reaction or conveniently prepared in situ during the redistribution reaction. In the latter case, there is added advantage in that the isoaltion of the complexe is no longer necessary. When the complexes of this invention are prepared, in situ, for the redistribution reaction, the ratio of the organotin to tin tetrahalide may vary within a wide range. Generally, a ratio of 10:1 to 1:10 can be used.

Further to illustrate this invention, specific examples are described hereinbelow.

Example 1.—Preparation of $(NCCH_2CH_2)_4Sn \cdot SnBr_4$ complex

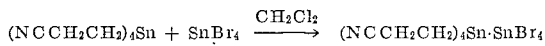

In this example, all the operations were carried out under an inert nitrogen atmosphere. Initially 40 ml. of methylene chloride in which there was dissolved 21.9 gm. (0.05 mole) of tin tetrabromide was added slowly, with stirring, into 16.7 gm. (0.05 mole) of tetrakis (2-cyanoethyl) tin. During addition, the temperature of the solution rose from 23° C. to 39° C., and a white solid immediately precipitated. After stirring for an additional 15 minutes, the mixture was filtered using water suction. The white solids were collected and dried in a vacuum desiccator at 1.5 mm. for 90 minutes. 34.9 gm. (90.4%) of the 1:1 complex, $$(NCCH_2CH_2)_4Sn \cdot SnBr_4$$

were obtained. The melting point of the complex was hazy at 104–106° C., and it did not clear until the temperature reached 120° C. The elemental analysis was as follows:

Calculated: Sn, 30.7; Br, 41.4; N, 7.20; C, 18.6; H, 2.1. Found: Sn, 30.82; Br, 40.8; N, 7.16; C, 18.95; H, 2.69.

Infrared spectroscopic analysis was performed on the white solids. The results of both analyses indicate that the 1:1 complex of $(NCCH_2CH_2)_4Sn \cdot SnBr_4$ was formed.

Example 2.—Preparation of $(NCCH_2CH_2)_4Sn \cdot SnCl_4$ complex

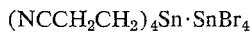

Similar to Eaxmple 1, all the operations were carried out under nitrogen atmosphere. In this example, 40 mls. of $CH_2Cl_2$ solution, in which there was dissolved 13.0 gm. of $SnCl_4$, was added slowly, with agitation, into 16.7 gms. (0.05 mole) of tetrakis(2-cyanoethyl)tin. A white precipitate was formed immediately while the temperature of the reaction mixture increased from 21° C. to 42° C. and a gentle reflux occurred. After stirring for an additional 20 minutes the solids were recovered by filtration. The white solids were then placed in a drying dish and put in a desiccator for drying for 1 hour at 1.5 mm. vacuum. 27.9 gms. of 1:1 complex $(NCCH_2CH_2)_4Sn \cdot SnCl_4$ were obtained. The melting point of the complex was determined using a sealed capillary which showed a hazy melt at 122° C.–124° C. The elemental analysis was as follows:

Calculated, percent: Sn, 39.9; Cl, 23.8–23.9; N, 9.4. Found, percent: Sn, 38.59; Cl, 22.74; N, 8.39. Infrared spectroscopic analysis was also determined.

The results of both analyses indicate that a 1:1 complex of $(NCCH_2CH_2)_4Sn \cdot SnCl_4$ was formed. The resultant complex is impure, due to impurities in the $SnCl_4$ used. This complex as well as the complex prepared in Example 1 are highly sensitive to moisture.

Example 3.—Preparation of $(NCCH_2CH_2)_4Sn \cdot 2AlCl_3$ complex

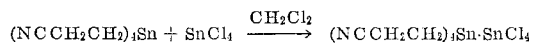

Again, the experimental procedure was carried out in a nitrogen atmosphere. 13.3 gms. of $AlCl_3$ were added initially to a flask followed by the addition of 50 mls. of $CH_2Cl_2$ which dissolved some of the $AlCl_3$ to form a red solution. 8.4 gms. of $(NCCH_2)CH_2)_4Sn$ were then dissolved in 50 ml. of $CH_2Cl_2$, and the resultant solution was added at a fairly rapid rate into the flask containing $AlCl_3$. The addition caused a slight increase of temperature from 23° to 24° C. and the formation of a cloudy white solution. A large portion of $AlCl_3$ chips remained undissolved. After an additional 30 minutes of agitation, the reaction mixture was filtered while the yellow chips of $AlCl_3$ were left in the flask. The white solids on the filter were dried similar to the previous examples. The dry weight of the white solid was 1.5 gms. The white solid sealed in a capillary showed a melting point at 95° C.–97° C. The elemental analysis was as follows.

Calculated, percent: Sn, 19.73; Al, 8.98; N, 9.31. Found, percent: Sn, 19.67; Al, 9.05; N, 9.08. Infrared spectroscopic analysis was performed. Both analyses indicate the formation of a $(NCCH_2CH_2)_4Sn \cdot 2AlCl_3$ complex formation.

Examples 4–16.—Redistribution reactions

In the following examples, various amounts of tetrakis (2-cyanoethyl)tin and tin tetrabromide were used to prepare redistribution compositions containing $(NCCH_2CH_2)_3SnBr$, $(NCCH_2CH_2)_2SnBr_2$ and $(NCCH_2CH_2)SnBr_3$. Although all three possible bromides were obtained in each of the examples, for purposes of illustration, only one of the three bromides was isolated in each example. Tris(2-cyanoethyl)tin bromide was isolated as the corresponding acetate while di(2-cyanoethyl)tin dibromide was converted to sulfide. To isolate (2-cyanoethyl)tin tribromide, the reaction mass was extracted with hot carbon tetrachloride. For the purpose of computing the yield, the redistribution reactions may be approximated by the following formulas:

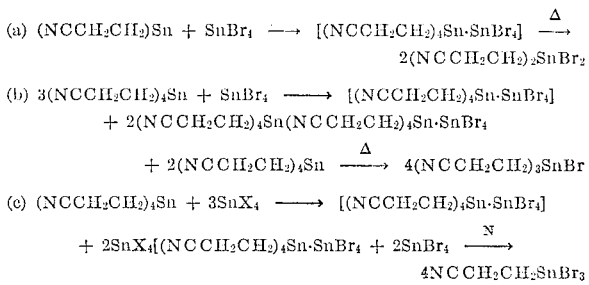

For illustrative purposes, Example 8 is described in detail hereinbelow. It is understood that other examples were carried out in substantially the same manner only the reaction variables were changed. The reaction variables as well as the results of these examples are listed in Table 1.

Example 8.—Preparation of tris(2-cyanoethyl)tin bromide

To 25.1 g. (0.075 mole) of $Sn(CH_2CH_2CN)_4$ were added 11.0 g. (0.025 mole) of $SnBr_4$. A white precipitate of the 1:1 complex appeared immediately upon mixing the reactants. The mixture was heated to 104° and maintained at this temperature for 5½ hours. After cooling to room temperature, the product, which was an orange viscous oil, was dissolved in 200 ml. of a 1:1 water-acetone mixture. Silver acetate (16.1 g., 0.1 mole) was added to this solution and the mixture agitated for 1 hour and then filtered in order to remove any silver bromide, which formed. The clear yellow mother liquor was stripped to dryness, using a rotary evaporator. 29.6 g. of yellowish-white solids were obtained as residue. These solids were dissolved in 200 ml. of hot tetrahydrofuran and the solution was then filtered in order to remove a small amount of insoluble material. Addition of 100 ml. of dry ethyl ether caused solids to precipitate out of the THF solution. The yellow solids, after filtration, weighed 21.4 g. Recrystallization of the solids from a THF-ethyl ether solvent pair yielded 19.2 g. of tris(2-cyanoethyl)tin acetate, M.P.=144–6°. Infrared-spectrum of product obtained could be superimposed on that of an authentic sample, prepared previously. Yield of tris(2-cyanoethyl)tin bromide, based on tris(2-cyanoethyl)tin acetate isolated, was 56.8%.

sulfide and the monochloride as acetate. Following is an illustrative example describing one of the experiments for the purpose of isolating $(NCCH_2CH_2)_3SnCl$ from redistribution. The redistribution reaction may be considered to proceed in the following manner, although it is understood that the complex formed, in situ, and that the resultant composition contained all three forms of chlorides:

TABLE I
REDISTRIBUTION RESULT

| Example | Reactants, molar ratio $R_4Sn:SnBr_4$ | Catalyst (5% $AlCl_3$) | Solvent (toluene) | Reaction temp. (°C.) | Reaction time (hrs.) | Expected product | Products obtained and yield (percent) | | | |
|---|---|---|---|---|---|---|---|---|---|---|
| | | | | | | | $R_3SnBr$ [1] | $R_2SnBr_2$ [2] | $RSnBr_3$ | $R_4Sn$ |
| | 3:1 | Yes | No | 115 | 4 | $R_3SnBr$ | 17.6 | | | |
| | 3:1 | Yes | No | (3) | | $R_3SnBr$ | 0 | | | |
| | 3:1 | Yes | No | 105 | 5 | $R_3SnBr$ | 39.9 | | | |
| | 3:1 | No | No | (4) | | $R_3SnBr$ | 31.3 | | | |
| | 3:1 | No | No | 104 | 5 | $R_3SnBr$ | 56.8 | | | |
| | [5] 3:1 | No | No | 104 | 5 | $R_3SnCl$ | 41.1 | | | |
| 0 | 1:1 | Yes | No | 120 | 4 | $R_2SnBr_2$ [2] | | 6.2 | | |
| 1 | 1:1 | No | No | 120 | 4 | $R_2SnBr_2$ | | 7.7 | | |
| 2 | 1:1 | No | Yes | 104 | 4 | $R_2SnBr_2$ | | 13.2 | | |
| 3 | 1:1 | No | No | 120 | 4 | $R_2SnBr_2$ | | 3.8 | | |
| 4 | 1:1 | No | No | 104 | 5 | $R_2SnBr_2$ | | <1.0 | | |
| 5 | 1:1 | No | No | | | $R_2SnBr_2$ | [6] 12.8 | 5.9 | [6] 4.3 | [7] 69.2 |
| 6 | 1:3 | No | No | 104 | 5 | $RSnBr_3$ | [6] 50.0 | | 3.4 | |

[1] Isolated as the corresponding acetate, $(NCCH_2CH_2)_3SnOAc$.
[2] Isolated as the corresponding sulfide, $[(NCCH_2CH_2)_2SnS]_3$.
[3] Reaction took off and reached a high of 155° C.
[4] Reaction took off and reached a high of 147° C. and then allowed to cool to room temperature.
[5] $SnCl_4$ was used instead of $SnBr_4$.
[6] Yields based on percent of $CH_2CH_2CN$ in product over the total $CH_2CH_2CN$ groups in reactants.
[7] Unreacted.

In industrial applications of the present redistribution method where the recovery of each halide in the resultant composition is desirable, the isolation techniques used in the previous examples can be combined into a single recovery procedure containing the following operational steps:

(1) Heat 1:1 complexes with excess $SnBr_4(SnCl_4)$ or excess tetrakis(2-cyanoethyl)tin or by the themselves to temperatures of 100–120°.

(2) Maintain temperature at 100–120 for 4 to 6 hours.

(3) Cool reaction mass to room temperature, extract with hot carbon tetrachloride. Isolate 2-cyanoethyltin tribromide, if present, from carbon tetrachloride solution by cooling to room temperature.

(4) Dissolve unextracted reaction mass in water. Filter if necessary. Separate any unreacted tetrakis(2-cyanoethyl)tin from aqueous layer.

(5) Add silver acetate to aqueous solution.

(6) Filter off unreacted silver acetate together with any silver chloride (or bromide) formed.

(7) Strip aqueous solution to dryness.

(8) Extracted solid (grey-black) residue with hot tetrahydrofuran containing a little decolorizing charcoal and filter.

(9) To clear filtrate add ethyl ether. White crystalline solid will form if any tris(2-cyanoethyl)tin acetate is present.

(10) Filter off tris(2-cyanoethyl)tin acetate.

(11) To mother liquor add an excess aqueous sodium sulfide solution. Olive-green solution forms.

(12) Acidify with acetic acid.

(13) A white solid of bis(2-cyanoethyl)tin sulfide will form if any were present.

(14) Filter off bis(2-cyanoethyl)tin sulfide.

Example 17.—Redistribution of $(NCCH_2CH_2)Sn \cdot SnCl_4$

Similar to Examples 4–16, the complex of $(NCCH_2CH_2)Sn \cdot SnCl_4$ was successfully redistributed either alone or with excess of $(NCCH_2CH_2)Sn$ or $SnCl_4$ at temperatures between 100°–120° C. for 4 to 6 hours. $(NCCH_2CH_2)_3SnCl$, $(NCCH_2CH_2)_2SnCl_2$ and $(NCCH_2CH_2)SnCl_3$ were recovered, the dichloride as $$3(NCCH_2CH_2)_4Sn + SnCl_4 \xrightarrow[102°C.]{\Delta} 4(NCCH_2CH_2)_3SnCl$$

Under a nitrogen atmosphere, 20.1 gms. of $(NCCH_2CH_2)_4Sn$ were added to a flask followed by the addition of 5.2 gms. of $SnCl_4$ with agitation. A white solid complex was formed in the $(NCCH_2CH_2)_4Sn$ oil. At this point, the heat was applied so as to regulate the pot temperature at 102° C. With agitation the reaction was held at this temperature for 5 hours. The complex melted at 75° C., and at 102° C. The reaction mixture was in the form of a yellow oil. After 5 hours of reaction, a viscous reddish brown oil was obtained when the reaction mixture was cooled to room temperature. The oil recovered was dissolved in 150 mls. 1:1 $H_2O$-acetone solvent and subsequently reacted with 13.4 gms. (0.08 mole) of silver acetate to form $(NCCH_2CH_2)_3SnOAc$. The reaction time with agitation was 30 minutes. 10 mls. of acetic acid was added to insure complete reaction. The resultant reaction mixture was filtered and the filtrate was stripped to dryness. During the stripping whent he acetone first evaporated leaving just $H_2O$, a yellow oil dropped out of the solution. This oil was removed before the filtrate was evaporated to complete dryness. Oil removed weighed 5.1 gms. and had a $N_D^{22}$ 1.5327, corresponding to the unreacted $(NCCH_2CH_2)_4Sn$. Additional oil was removed from the filtrate during the stripping operation. The Tan solids obtained weighed 12.0 gms. The Tan solids were purified in the conventional manner, and the melting point and infrared spectroscopic analysis indicates $(NCCH_2CH_2)_3SnOAc$ was obtained. The yield was 41.1%

We claim:

1. A method for preparing an organotin complex of the general formula:

$$\{R_1-\underset{\underset{R_4}{|}}{\overset{\overset{R_2}{|}}{Sn}}-R_3\} \cdot yL$$

in which $R_1$ is $NC(CH_2)_m-$, $m$ is an integer at least about 2, $R_2$, $R_3$, and $R_4$ each is an alkyl radical, an aryl radical or $NC(CH_2)_m-$, $y$ is 1 or 2, and L is a Lewis acid which comprises reacting (i) a first compound of the formula:

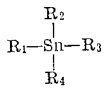

with (ii) a Lewis acid in an inert non-donor solvent, and recovering said complex.

2. A method according to claim 1 wherein the Lewis acid is selected from the group consisting of boron trifluoride, aluminum chloride, titanium tetrachloride, tin tetrachloride, and tin tetrabromide.

3. A method for preparing an organotin complex of the general formula:

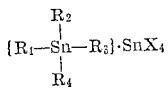

in which $R_1$ is $NC(CH_2)_m$, $m$ is an integer at least about 2, $R_2$, $R_3$, and $R_4$ each is an alkyl radical, an aryl radical or $NC(CH_2)_m$, X is chlorine or bromine which comprises reacting (i) a first compound of the formula:

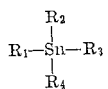

with (ii) a second compound of the formula:

$$SnX_4$$

in an inert non-donor solvent at a temperature in the range between $-10°$ C. to $60°$ C., and in an inert atmosphere, and recovering said complex.

4. A method according to claim 3 wherein said $m$ is less than 5.

5. A method for preparing an organotin complex of the general formula:

$$[NC(CH_2)_m]_4Sn \cdot SnX_4$$

in which $m$ is an integer 2–4, and X is chlorine or bromine which comprises reacting (i) a nitrile of the general formula:

$$[NC(CH_2)_m]_4Sn$$

with (ii) a Lewis acid of the general formula:

$$SnX_4$$

in an inert non-donor solvent at a temperature in the range between $-10°$ C. to $60°$ C., and in an inert atmosphere, and recovering said tetra nitrile complex.

6. A method according to claim 5 in which $m$ is 2, the molar ratio of the nitrile and the Lewis acid is in the range from about ½ to about 2, and the solvent is methylene chloride or chloroform.

7. A method for preparing an organotin composition comprising a mixture of compounds having the structural formulas: (i) $(R)_3SnX$, (ii) $(R)_2SnX_2$, and (iii) $RSnX_3$ in which R is an alkyl, an aryl or a $[NC(CH_2)_m]$-group, $m$ is an integer at least about 2, X is chlorine or bromine, and each of said formulas contains at least one $$[NC(CH_2)_m]\text{-group},$$

which comprises heating a complex of the formula:

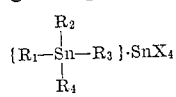

in which $R_1$ is $NC(CH_2)_m$—, $R_2$, $R_3$, and $R_4$ each is an akyl, an aryl or a $NC(CH_2)_m$— group at a temperature sufficient to redistribute the complex to from said organotin composition.

8. A method according to claim 7 wherein the complex has the formula:

$$[NC(CH_2)_m]_4Sn \cdot SnX_4$$

9. A method according to claim 8 in which there is added in the heating operation a compound of the formula:
$$SnX_4$$

10. A method according to claim 8 in which the heating operation is carried out at a temperature in the range from about 100° C. to 150° C.

11. A method according to claim 10 in which the heating operation is carried out for about 2–6 hours.

12. A method according to claim 8 in which the complex is prepared in situ prior to the heating operation.

13. A method according to claim 8 in which there is added in the heating operation a compound of the formula:

$$[NC(CH_2)_m]_4Sn$$

14. An organotin complex having a general structural formula:

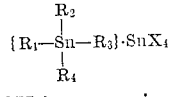

wherein $R_1$ is $[NC(CH_2)_m$—, $m$ is an integer at least about 2, $R_2$, $R_3$, and $R_4$ each is an alkyl, an aryl or $[NC(CH_2)_m]$— group, and X is chlorine or bromine.

15. An organotin complex of claim 14 wherein the general formula is:

$$[NC(CH_2)_m]_4Sn \cdot SnX_4$$

wherein $m$ is an integer 2–4.

16. An organotin complex of claim 15 wherein the general formula is:

$$(NCCH_2CH_2)_4Sn \cdot SnX_4$$

17. An organotin composition containing the redistribution products of the organotin complex having the general formula:

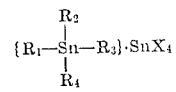

wherein $R_1$ is $[NC(CH_2)_m]$—, $m$ is an integer at least about 2, $R_2$, $R_3$, and $R_4$ each is an alkyl, an aryl or a $[NC(CH_2)_m]$— group, X is chlorine or bromine, said composition comprising a mixture of compounds having the general formulas:

$$(R)_3SnY, (R)_2SnY_2, \text{ and } RSnY_3$$

in which R is $R_1$, $R_2$, $R_3$ or $R_4$, and at least one of the R is $R_1$.

18. An organotin composition according to claim 17 wherein the redistribution products are from the organotin complex having the general formula:

$$[NC(CH_2)_m]_4Sn \cdot SnX_4$$

19. An organotin composition according to claim 18 wherein $m$ is an integer 2–4.

References Cited

UNITED STATES PATENTS

| | | | |
|---|---|---|---|
| 2,832,753 | 4/1958 | Weinberg et al. | 260—429.7 X |
| 3,015,644 | 1/1962 | Leistner et al. | 260—429.7 X |
| 3,069,446 | 12/1962 | Argabright et al. | 260—429.5 |
| 3,272,852 | 9/1966 | McCoy et al. | 260—429.5 |
| 3,305,570 | 2/1967 | Bacon | 260—429.5 X |
| 3,332,970 | 7/1967 | Smith | 260—429.7 |
| 3,347,833 | 10/1967 | Smith | 260—429.7 X |

OTHER REFERENCES

Kosolapoff, Chemical Abstracts, vol. 56 (1962), p. 2569.

Schossberger, Chemical Abstracts, vol. 56 (1962), p. 11085.

Arden, Chemical Abstracts, vol. 56 (1962), p. 8278.

TOBIAS E. LEVOW, *Primary Examiner.*

W. F. W. BELLAMY, *Assistant Examiner.*

U.S. Cl. X.R.

260—429.5, 448